United States Patent [19]

Moulson

[11] 4,281,693

[45] Aug. 4, 1981

[54] FELLER DIRECTOR

[75] Inventor: Donald C. Moulson, Burnaby, Canada

[73] Assignee: Forest Engineering Research Institute of Canada, Vancouver, Canada

[21] Appl. No.: 58,493

[22] Filed: Jul. 18, 1979

[51] Int. Cl.[3] .......... A01G 23/08

[52] U.S. Cl. .......... 144/34 R; 83/928; 144/34 A

[58] Field of Search .......... 83/928; 144/2 Z, 3 D, 144/34 R, 34 A, 34 B, 309 AC

[56] References Cited

U.S. PATENT DOCUMENTS

| | | | |
|---|---|---|---|
| 3,364,960 | 1/1968 | Collins, Jr. et al. | 144/34 R |
| 3,664,391 | 5/1972 | Coffey | 144/34 R |
| 3,672,412 | 6/1972 | Albright | 144/34 A |
| 3,683,979 | 8/1972 | Peltola et al. | 144/34 R |
| 3,726,326 | 4/1973 | Coleman | 144/34 R |
| 3,848,648 | 11/1974 | Dika et al. | 144/34 R |
| 4,013,106 | 3/1977 | Albright | 144/3 D |
| 4,161,200 | 7/1979 | Albright | 144/34 R |

FOREIGN PATENT DOCUMENTS

| | | | |
|---|---|---|---|
| 960547 | 1/1975 | Canada | 144/34 R |
| 586872 | 1/1978 | U.S.S.R. | 144/34 R |
| 620247 | 8/1978 | U.S.S.R. | 144/34 R |

*Primary Examiner*—W. D. Bray

*Attorney, Agent, or Firm*—Fulwider, Patton, Rieber, Lee & Utecht

[57] ABSTRACT

A feller head for a tree felling apparatus comprises a first forward projection adjacent a tree trunk receiving recess. A chain saw is mounted within the first projection and extends away from the first projection in the direction of the recess. A motor for powering the chain saw is operatively connected to the chain saw within the first projection. There is a mechanism for slidably moving the chain saw along a curved path within the projection. The path is convex in the direction of the recess.

17 Claims, 5 Drawing Figures

FELLER DIRECTOR

BACKGROUND OF THE INVENTION

The invention relates to a feller head for a tree felling apparatus.

Feller heads connected to articulated booms of self-powered vehicles are well known and commonly used in mechanized forestry operations. For example, such feller heads are disclosed in U.S. Pat. No. 3,749,143 to Hamilton or U.S. Pat. No. 3,796,242 to Albright. However, there have been limitations placed on the use of such boom-mounted feller heads. For example, they have been limited in the size of tree which can be cut. If the feller heads are simply scaled larger for larger diameter trees, the size and weight make boom-mounting impractical.

As a consequence, previous feller heads adapted for larger diameter trees are not suitable for boom-mounting, but are mounted directly on the front of the vehicle as seen, for example, in U.S. Pat. Nos. 3,874,432 and 3,946,775, both to Albright.

Such feller heads mounted on the front of a tractor must approach the tree trunk very closely. The terrain or obstacles adjacent the tree may make this impractical. U.S. Pat. No. 3,946,775 discloses a stump gripper below the chain saw of a feller head so the feller head is secured to the portion of the tree trunk remaining in the ground.

One reason why prior art feller heads for larger diameter trees have been too large for boom-mounting has been the size of head required to accommodate the degree of movement of the chain saw required to sever larger trees. Generally speaking, two different types of chain saw movement have been suggested. For example, chain saws pivotable about a point in the feller head are found in U.S. Pat. Nos. 2,882,941; 3,885,610; 3,976,111; 3,991,799; 3,074,447; and 3,726,326. This last patent, U.S. Pat. No. 3,726,326 to Coleman, discloses a tree-felling machine with a second chain saw which moves in a different manner while cutting the tree. This saw is mounted on a carriage which moves from end to end on an elongate horizontal plate. In either case, the size of head required to accommodate the movement for severing larger trees is too large for boom-mounting.

U.S. Pat. No. 2,882,941 to Pope discloses a saw which moves through a relatively small angle in cutting trees. However, this is achieved by mounting the saw on a control arm for rotation about a bearing. The use of the relatively long control arm is undesirable with the design of a compact feller head.

U.S. Pat. No. 2,846,175 to Sexton discloses a support for a tree-topping apparatus where the frame of a saw is provided with a projection at its bottom that fits into arcuate slots.

SUMMARY OF THE INVENTION

A feller head for a tree felling apparatus comprises a first forward projection adjacent a tree trunk receiving recess. A chain saw is mounted within the first projection and extends away from the first projection in the direction of the recess. A motor for powering the chain saw is mounted within the first projection. There is a means for moving the chain saw along a curved path within the first projection. The path is convex in the direction of the recess.

When compared with the prior art, a feller head according to the invention is compact and light in weight. Even when made sufficiently large to accommodate trees of large diameters, for example 36", the feller head can still be mounted on the end of an articulated boom of a self-propelled vehicle. One embodiment of the invention for cutting up to 36" diameter trees measures approximately 69"×60". By comparison, one example of the prior art measures 82"×82". Similarly, the weight is only 3500 lbs compared with approximately 7000 lbs for a prior art feller head of similar capacity.

Feller heads according to the present invention also offer distinct advantages compared with those where the pusher mechanism pushes the tree sideways. This sideways pushing means that the tree falls over part of the feller head, possibly resulting in damage to the head. Additionally, a spin is imparted to the tree and it may possibly fall in an unpredictable manner. The pusher mechanism according to an embodiment of the present invention pushes the tree forwardly in the same direction as it is cut. The tree does not fall over any part of the feller head and tends to fall in a predictable manner. Further, since the tree rests against the head, there is no possible kick-back during the felling operation.

Figure 3:
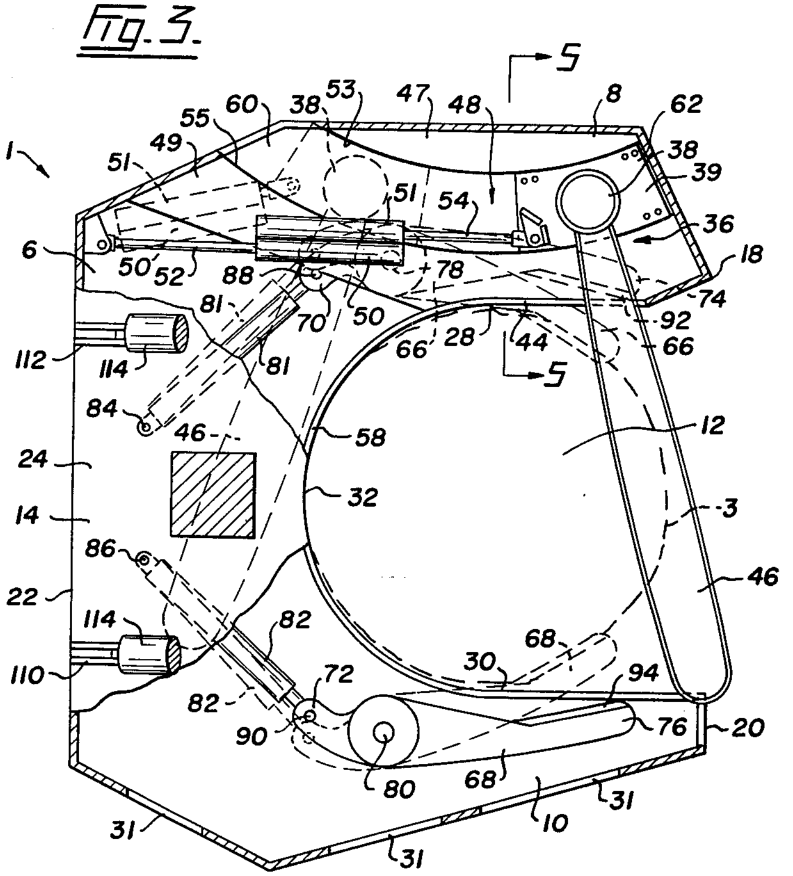
FIG. 3 is a top plan view of the feller head partly broken away.
Figure 5:
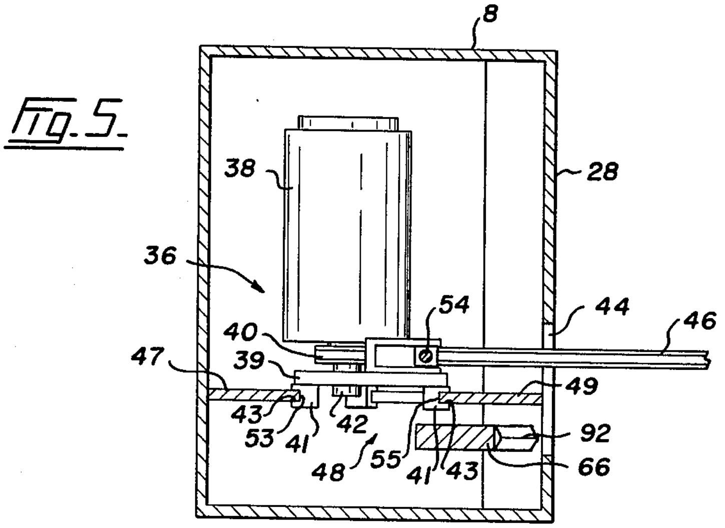
Figure 4:
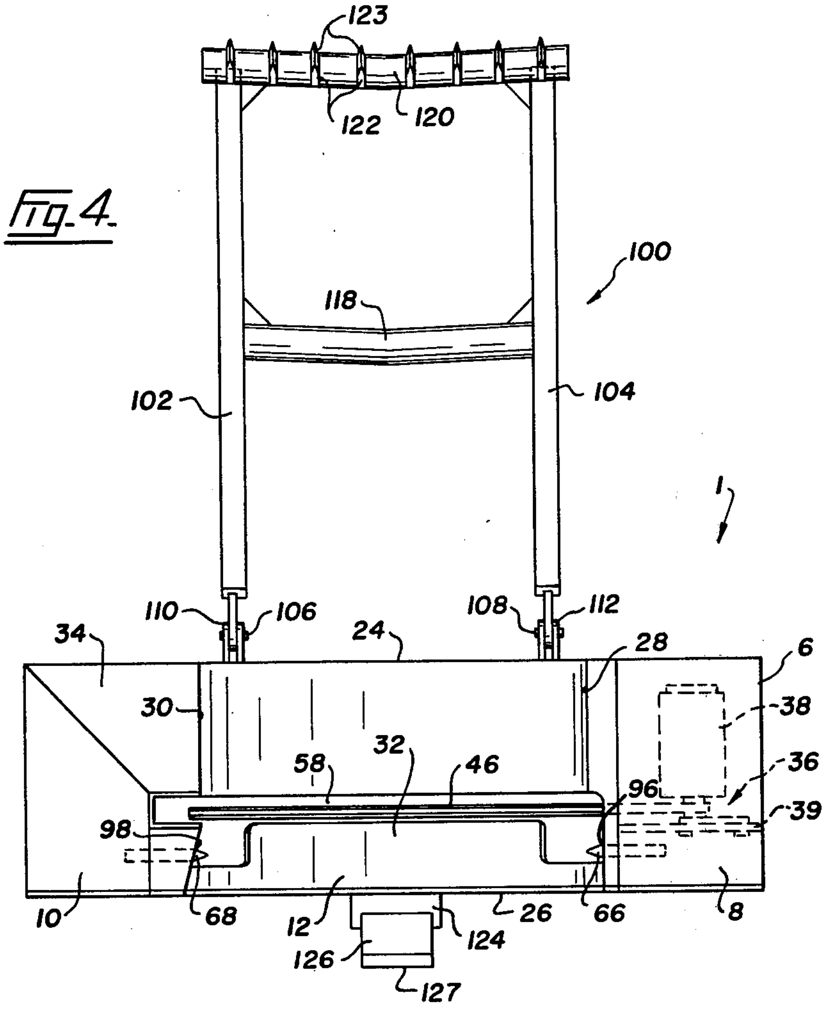

FIG. 4, appearing after FIG. 5, is a front elevational view of the feller head; and FIG. 5 is a sectional view taken along line 5—5 of FIG. 3.

DESCRIPTION OF THE PREFERRED EMBODIMENTS

Figure 1:
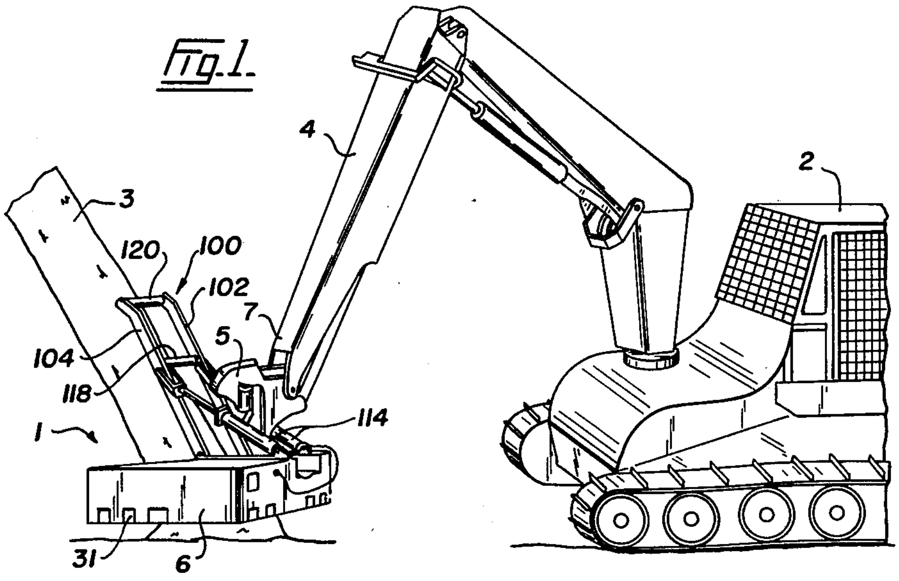
FIG. 1 is an isometric view showing a feller head, according to an embodiment of the invention, mounted on the boom of a self-propelled vehicle.

FIG. 1 shows a feller head 1 comprising part of an apparatus for felling trees including a self-propelled tracked vehicle 2 and an articulated boom 4. By means of rotator 5, the head 1 is rotatable through an angle of plus or minus 75° horizontally and this has been found adequate with a boom swing of plus or minus 80°. A suitable rotator is commonly available under the Trade Mark "Osa". A transverse tilt of plus or minus 10° is needed when the apparatus is to be used on steep slopes, but is not necessary for flat terrain.

Figure 2:
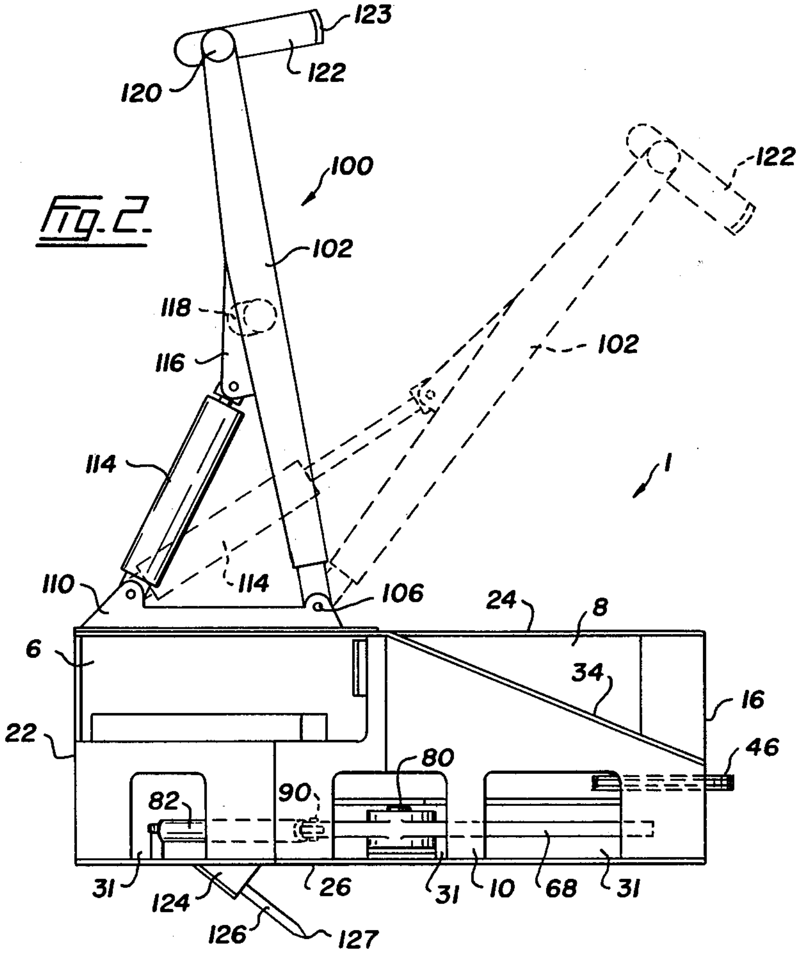
FIG. 2 is a side elevational view of the feller head.

Referring to FIGS. 2 to 4, the feller head 1 comprises a head enclosure 6 of steel plate and other commonly available structural steel components. The enclosure 6 is hollow and generally U-shaped with a first forward projection 8 and a second forward projection 10 with a tree receiving recess 12 therebetween. There is a back portion 14 of the enclosure interconnecting the forward projections 8 and 10. The feller head has a forward end 16 corresponding to the distal ends 18 and 20 of the forward projections. The enclosure 6 has a rear end 22, a top 24 and a bottom 26. The rotator 5 at the distal end 7 of the boom 4 is connected to the feller head 1 at the back portion 14 and on the top 24. The tree receiving recess 12 is defined by the inner sides 28 and 30 of the forward projections 8 and 10 which merge rearwardly with the concave back end 32 of the recess. The top and bottom of the first forward projection 8 are parallel while the second forward projection 10 has a forwardly sloping top surface 34. Rectangular apertures 31 permit snow, sawdust and other debris to leave the feller head.

As mentioned, the feller head enclosure 6 is hollow and contains a number of components. For example, a chain saw 36 is mounted within the first forward projection 8. Referring particularly to FIG. 6, the chain saw 36 has a motor 38, a Volvo (Trade Mark) model F11-78 hydraulic motor being suitable. A drive sprocket 40 is operatively connected to the motor shaft 42. There is a slot 44 extending along the inner side 28 of the first forward projection 8 from near the back end 32 of the recess 12 to near the distal end 18 of projection 8. The guidebar 46 of the chain saw 36 extends through the slot 44, away from the first projection 8 in the direction of recess 12 and generally towards the second forward projection 10.

The chain saw motor 38 is slidably mounted on the curved or arcuate guide track 48 comprising spaced-apart plates 47 and 49 with spaced-apart, curved edges 53 and 55 which are convex in the direction of the recess 12. The guide track 48 has a back end 60, a front end 62 and defines a segment of a circle with a centre to a side of first projection 8 opposite the recess 12. The guide track is a path along which the chain saw motor 38 moves. The motor 38 is bolted to a motor mount plate 39. As seen best in FIG. 5, a pair of guide shoes 41, with outwardly facing slots 43, are bolted to the bottom of plate 39 at one end. An identical pair of guide shoes, not shown, are bolted to plate 39 at the opposite end. Plates 47 and 49 are slidably received within the slots 43.

Two parallel cylinders 50 and 51 are connected together, side-by-side, within enclosure 6. In the preferred embodiment, the cylinders are bored in a common cylinder head. The guide track 48 and the hydraulic cylinders 50 and 51 provide means for moving the chain saw 36 along the first projection 8 in the curved path. The piston rod 52 of cylinder 50 is pivotally connected to the feller head enclosure 6 and the piston rod 54 of the cylinder 51 is pivotally connected to the plate 39. When piston rod 54 is retracted within cylinder 51, and rod 52 is retracted within cylinder 50, motor 38 is at the rearward position shown in broken lines in FIG. 3 and the guide bar 46 is received within the slot 58 at the back end 32 of the recess 12. When hydraulic fluid is supplied to cylinders 50 and 51, rods 52 and 54 move outwardly to move the chain saw 36 towards its front position shown in solid lines.

The feller head 1 also includes means for gripping the tree trunk and holding the trunk against the back portion 14 of the feller head while the chain saw 36 cuts the tree. The means for gripping comprises a pair of gripping arms 66 and 68. The arms have proximal ends 70 and 72 and distal ends 74 and 76. The gripping arms 66 and 68 are pivotally mounted within forward projections 8 and 10, respectively, by pins 78 and 80 which are near the proximal ends of the arms. Hydraulic cylinders 81 and 82 are pivotally mounted within the back portion 14 of the feller head by means of pins 84 and 86 and are pivotally connected to the proximal ends of the gripping arms by pins 88 and 90, respectively. The two gripping arms have inside sharpened edges 92 and 94 near their distal ends for engaging the tree trunk.

As seen in FIG. 4, the gripping arms 66 and 68 are between the guide bar 46 of the chain saw 36 and the bottom 26 of the feller head 1. The two gripping arms 66 and 68 project through slots 96 and 98 in forward projections 8 and 10 respectively. As shown in FIG. 3, the gripping arms 66 and 68 can be pivoted by means of cylinders 81 and 82, from the open position, where their distal ends 74 and 76 are within the projections 8 and 10 and near the forward end 16 of the feller head, outwardly across the recess 12 and towards the back end 32 of the recess. The outer position of the gripping arms 66 and 68 is the position of the gripping arms when securing the tree 3 against the back portion 14 of the feller head. Of course, the position of the arms depends upon the diameter of the trunk of the particular tree.

The feller head 1 has means for directing the fall of the tree after the trunk is cut by the chain saw 36. The means for directing comprises a pusher 100 mounted on the top 24 of the feller head 1. The pusher has two spaced-apart vertical members 102 and 104. Link pins 106 and 108 pivotally connect the bottom ends of vertical members 102 and 104 to the two pairs of spaced-apart lugs 110 and 112 which are welded to the top 24 of feller head 1. A pair of identical hydraulic cylinders 114 are each pivotally connected at one end to one of the pairs of lugs 110 or 112 and are pivotally connected at the other end to lugs 116 which are welded to the backs of vertical members 102 and 104. A tubular cross member 118 interconnects the vertical members 102 and 104 midway between the tops and bottoms thereof. The pusher 100 has an upper portion consisting of a crossbar 120, interconnecting the vertical member 102 and 104, and a plurality of spaced-apart forwardly extending bars 122. Bars 122 have sharpened, curved front edges 123. The pusher 100 can be pivoted by means of the fluid cylinders 114 towards the forward end 16 of the feller head 1, as shown in broken lines in FIG. 2.

A reaction shoe or reaction means 126, operating in guides 124, is connected to the bottom 26 of the feller head 1 adjacent the back end 32 of the recess 12. The reaction shoe 126 has a sharpened tip 127 and extends downwardly and forwardly from the back portion 14 of the feller head for contacting the tree trunk. Alternatively, the reaction shoe may comprise a series of spikes.

In operation, before felling a tree, the chain saw 36 is pulled rearwardly by hydraulic cylinders 50 and 51 to its back position, shown in broken lines in FIG. 3, near the back end 32 of the recess 12 and so guide bar 46 is within the slot 58 in the back portion 14 of the feller head. Similarly, cylinders 81 and 82 are used to move the gripping arms 66 and 68 to the open position within forward projections 8 and 10 as shown in FIG. 3. Pusher 100 is moved to the generally vertical position, shown in solid lines in FIG. 2, by the cylinders 114.

The operator of the vehicle 2, shown in FIG. 1, moves the feller head 1 towards the trunk of the tree 3, which he desires to cut, so the trunk enters the recess 12 of the feller head. The normal hydraulic controls for the boom 4 are used to orient the feller head 1 so that its top 24 and bottom 26 are horizontal. The forward end 16 of the feller head and the open end of the recess 12 face the direction in which the tree is to fall. After the tree trunk contacts the back end 32 of the recess 12 and reaction shoe 126 engages the tree, cylinders 81 and 82 are used to move gripping arms 66 and 68 so their sharpened edges 92 and 94 tightly engage the trunk of the tree 3. This secures the feller head to the tree for the cutting and felling operation.

Once the feller head 1 is secured to the tree 3, the chain saw 36 is moved forwardly by hydraulic cylinders 50 and 51 with the motor 38 operating. While this occurs, cylinders 114 pivot the pusher 100 forwardly so that the sharpened bars 122 contact the tree trunk. The pusher has several functions. Firstly, it provides a pre-push to make sure that the feller head 1 is properly attached to the tree. By pushing forwardly on the tree, the kerf is kept open during the cutting operation. By applying a force to the tree trunk, the direction of fall is determined.

As the chain saw 36 approaches the end of the cut, the tree will fall forwardly due to the action of pusher 100. In actual tests, a 36" diameter tree was cut in approximately 15 seconds. The movement of the chain saw 36 by cylinders 50 and 51 is stopped before the chain saw 36 reaches the outside of the tree trunk so that the chain saw will not be struck when the tree falls. The tree falls forwardly and does not fall over any portion of the feller head 1. Moreover, since the tree rests against the feller head, kick-back is eliminated. The tree falls in the direction of the cut of chain saw 36 and there is no tendency for the tree to spin. Because the contact between the pusher 100 and the tree is through the sharpened vertical edges 123 of bars 122, axial movement along the tree trunk is allowed, but side movement is minimized.

Since the gripping arms 66 and 68 are located below the chain saw 36, they remain attached to the stump of the tree below the cut, so the feller head 1 remains firmly in place before, during and after the cutting operation.

After the tree 3 falls, the gripping arms 66 and 68 can be returned to their open position by cylinders 81 and 82 and the feller head can be removed from the tree. Once the chain saw 36 is returned to the rearward position and pusher 100 to the vertical position, the feller head is ready to fell another tree.

What I claim is:

1. A feller head for a tree felling apparatus, comprising: a first forward projection adjacent a tree trunk receiving recess; a chain saw having opposing ends mounted within the first projection, one of said ends extending away from the first projection in the direction of the recess, and having a motor for powering the chain saw mounted within the first projection; and means for moving the chain saw opposing ends along curved substantially parallel paths within the projection, the path being convex in the direction of the recess.

2. A feller head, as claimed in claim 1, the path being arcuate.

3. A feller head, as claimed in claim 2, the first projection having a distal end near a foward end of the feller head, the recess extending rearwardly from the forward end of the head to a back end of the recess, the means for moving comprising means for moving the chain saw along the arcuate path, from a back position near the back end of the recess, to a front position near the distal end of the first projection.

4. A feller head, as claimed in claim 3, the means for moving comprising an arcuate guide track with a back end near the back end of the recess and a front end near the distal end of the first projection, the guide track being convex in the direction of the recess, the chain saw motor being slidably mounted on the guide track.

5. A feller head, as claimed in claim 4, the means for moving comprising a fluid cylinder mounted within the first projection.

6. A feller head, as claimed in claim 5, the first projection being hollow, having an inner side adjacent the recess, and having a slot along the inner side from near the back end of the recess to near the distal end of the first projection, the chain saw extending through the slot and being movable along the slot when cutting the tree.

7. A feller head, as claimed in claim 1, the feller head being generally U-shaped with a second forward projection on a side of the recess opposite the first forward projection and a back portion interconnecting the foward projections, the chain saw extending across the recess from the first projection to the second projection when cutting a tree.

8. A feller head, as claimed in claim 7, comprising means for gripping the tree trunk and holding the tree trunk against a back portion of the feller head while the chain saw cuts the tree to eliminate kick-back when the tree falls.

9. A feller head, as claimed in claim 8, the means for gripping comprising a pair of gripping arms, each said arm being pivotally mounted within one of the forward projections and having a distal end, and a fluid cylinder connected to the gripping arms within the feller head for pivoting the arms away from an open position, where the distal ends are within the forward projections and near a forward end of the feller head, outwardly across the recess and towards the back end thereof, for securing the tree trunk between the gripping arms and the back portion of the feller head.

10. A feller head, as claimed in claim 9, having a bottom below the chain saw when the feller head is in use, the gripping arms being between the chain saw and the bottom of the feller head, thereby securing the feller head to the portion of the tree trunk below the cut of the chain saw.

11. A feller head, as claimed in claim 1, having a top and comprising means for directing the fall of the tree after the trunk of the tree is cut by the chain saw, the means for directing comprising a pusher pivotally mounted on the top of the feller head, being pivotable towards a forward end of the feller head and having an upper portion, above the feller head when the feller head is in use, with means for contacting the tree, and a fluid cylinder for pivoting the pusher towards the forward end of the head so the upper portion of the pusher contacts the tree and directs the fall of the tree.

12. A combination of a feller head, as claimed in claim 1 or claim 11, and a self-propelled vehicle with an articulated boom, the feller head being connected to an end of the boom distal the vehicle.

13. A combination, as claimed in claim 12, the boom being connected to the back portion of the feller head at the top thereof.

14. A feller head, as claimed in claim 11, comprising a reaction means extending downwardly and forwardly from the back portion of the feller head for contacting the tree.

15. A feller head, as claimed in claim 14, the reaction means being elongate and pointed.

16. A feller head, as claimed in claim 2, or claim 11, the path defining a segment of a circle with a center to a side of the first projection opposite the recess.

17. A feller head, as claimed in claim 11, the upper portion of the pusher comprising a plurality of bars with curved and sharpened forward edges for contacting the tree, permitting axial movement along the tree and opposing sideways movement.

* * * * *